(12) United States Patent
Richer et al.

(10) Patent No.: US 12,446,973 B2
(45) Date of Patent: Oct. 21, 2025

(54) GUIDANCE FOR NAVIGATION AND POSITIONING OF INTRAVASCULARLY DELIVERED DEVICES

(71) Applicant: St. Jude Medical, Cardiology Division, Inc., St. Paul, MN (US)

(72) Inventors: Louis-Philippe Richer, Montreal (CA); Nikolaos Politis, Berlin (DE); Jan Mangual, Rho (IT); Saurabh Datta, Pleasanton, CA (US); Luc Soucie, Clarence Creek (CA); Theodore Paul Dale, Corcoran, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 0 days.

(21) Appl. No.: 18/441,686

(22) Filed: Feb. 14, 2024

(65) Prior Publication Data
US 2024/0299101 A1     Sep. 12, 2024

(30) Foreign Application Priority Data
Mar. 9, 2023 (EP) ..................................... 23386019

(51) Int. Cl.
*A61B 34/20* (2016.01)
*A61B 5/06* (2006.01)
(Continued)

(52) U.S. Cl.
CPC .............. *A61B 34/20* (2016.02); *A61B 5/068* (2013.01); *A61B 17/12122* (2013.01); *A61B 17/12172* (2013.01); *A61B 34/10* (2016.02); *A61B 2017/00026* (2013.01); *A61B 2017/1205* (2013.01); *A61B 2034/105* (2016.02); *A61B 2034/2051* (2016.02)

(58) Field of Classification Search
CPC .... A61B 34/20; A61B 5/068; A61B 17/12122
See application file for complete search history.

(56) References Cited

U.S. PATENT DOCUMENTS 7,365,745 B2   4/2008   Olson
7,774,051 B2   8/2010   Voth
(Continued)

*Primary Examiner* — Rochelle D Turchen
(74) *Attorney, Agent, or Firm* — SLEMAN & LUND LLP

(57) ABSTRACT

Techniques are provided for guidance for navigation and positioning of intravascularly delivered devices. A medical navigation system includes a delivery device comprising a catheter, an intravascularly delivered device configured to be releasably disposed in the catheter for deployment at a target site of a patient, and a navigation computer system. The intravascularly delivered device includes a plurality of electrodes including at least one indicator electrode and at least one reference electrode configured to not contact tissue when the intravascularly delivered device is deployed at the target site. The navigation computer system is configured to be electrically coupled with the plurality of electrodes. The navigation computer system controls a drive source to transmit current to the plurality of electrodes, collects electrode data corresponding to the plurality of electrodes, monitors impedance corresponding to the indicator electrode, and determines that the indicator electrode has made contact with tissue.

18 Claims, 11 Drawing Sheets

(51) Int. Cl.
  *A61B 17/12* (2006.01)
  *A61B 34/10* (2016.01)
  *A61B 17/00* (2006.01)

(56) References Cited

U.S. PATENT DOCUMENTS

| | | |
|---|---|---|
| 7,825,925 B2 | 11/2010 | Voth |
| 7,885,707 B2 | 2/2011 | Hauck |
| 7,894,871 B2 | 2/2011 | Wittkampf |
| 7,988,639 B2 | 8/2011 | Starks |
| 8,038,625 B2 | 10/2011 | Afonso |
| 8,130,221 B2 | 3/2012 | Voth |
| 8,229,545 B2 | 7/2012 | Afonso |
| 8,253,725 B2 | 8/2012 | Voth |
| 8,352,019 B2 | 1/2013 | Starks |
| 8,364,253 B2 | 1/2013 | Voth |
| 8,454,538 B2 | 6/2013 | Wittkampf |
| 8,454,589 B2 | 6/2013 | Deno |
| 8,647,284 B2 | 2/2014 | Afonso |
| 8,805,490 B2 | 8/2014 | Hauck |
| 8,825,144 B2 | 9/2014 | Starks |
| 8,849,393 B2 | 9/2014 | Hauck |
| 9,026,196 B2 | 5/2015 | Curran |
| 9,078,591 B2 | 7/2015 | Wittkampf |
| 9,111,175 B2 | 8/2015 | Strommer |
| 9,113,807 B2 | 8/2015 | Koyrakh |
| 9,159,162 B2 | 10/2015 | Carbonera |
| 9,198,601 B2 | 12/2015 | Hauck |
| 9,204,927 B2 | 12/2015 | Afonso |
| 9,237,920 B2 | 1/2016 | Leo |
| 9,339,325 B2 | 5/2016 | Miller |
| 9,392,973 B2 | 7/2016 | Curran |
| 9,486,152 B2 | 11/2016 | Craven |
| 9,549,689 B2 | 1/2017 | Olson |
| 9,560,988 B2 | 2/2017 | Carbonera |
| 9,585,586 B2 | 3/2017 | Koyrakh |
| 9,591,990 B2 | 3/2017 | Chen |
| 9,597,036 B2 | 3/2017 | Aeby |
| 9,610,027 B2 | 4/2017 | Hauck |
| 10,278,614 B2 | 5/2019 | Curran |
| 10,441,192 B2 | 10/2019 | Thompson |
| 10,443,929 B2 | 10/2019 | Janeke |
| 10,448,859 B2 | 10/2019 | Wehner |
| 10,463,303 B2 | 11/2019 | Donnay |
| 10,492,869 B2 | 12/2019 | Malinin |
| 10,512,419 B2 | 12/2019 | Craven |
| 10,675,086 B2 | 6/2020 | Afonso |
| 10,729,500 B2 | 8/2020 | Quinn |
| 10,750,975 B2 | 8/2020 | Hill |
| 10,799,148 B2 | 10/2020 | Mosesov |
| 10,799,188 B2 | 10/2020 | Erdemir |
| 11,205,300 B2 | 12/2021 | Carbonera |
| 11,636,651 B2 | 4/2023 | Carbonera |
| 2006/0247680 A1 | 11/2006 | Amplatz |
| 2009/0171386 A1 | 7/2009 | Amplatz |
| 2011/0098594 A1 | 4/2011 | Hauck |
| 2011/0152712 A1* | 6/2011 | Cao .................. A61B 5/6852 606/33 |
| 2013/0296679 A1 | 11/2013 | Condie |
| 2019/0274668 A1 | 9/2019 | Glimsdale |
| 2020/0107836 A1* | 4/2020 | O'Halloran ........ A61B 18/1492 |
| 2023/0248956 A1 | 8/2023 | Tracee |
| 2023/0270992 A1 | 8/2023 | Eidenschink |
| 2023/0404658 A1* | 12/2023 | O'Halloran ............ G16H 40/63 |
| 2024/0293071 A1* | 9/2024 | Constantine ........... A61B 5/287 |

* cited by examiner

GUIDANCE FOR NAVIGATION AND POSITIONING OF INTRAVASCULARLY DELIVERED DEVICES

CROSS-REFERENCE TO RELATED APPLICATIONS

The present application claims the benefit of the filing date of European Patent Application No. EP 23386019.6, filed Mar. 9, 2023, the disclosure of which is hereby incorporated by reference herein.

FIELD OF THE DISCLOSURE

The present disclosure relates generally to delivering, positioning, and/or deploying an intravascularly delivered device. More particularly, embodiments described herein relate to systems, devices, and methods for providing cardiovascular imaging guidance during an intravascular procedure.

BACKGROUND

The left atrial appendage (LAA) is a muscular pouch extending from the anterolateral wall of the left atrium of the heart. The LAA serves as a reservoir for the left atrium. During a normal cardiac cycle, the LAA contracts with the left atrium to pump blood to the left ventricle. This atrial contraction generally prevents blood from stagnating within the LAA. However, during cardiac cycles characterized by arrhythmias (e.g., atrial fibrillation), the LAA may fail to adequately contract. As a result, blood may stagnate within the LAA. Stagnant blood within the LAA is susceptible to coagulating and forming a thrombus, which can dislodge from the LAA and ultimately result in an embolic stroke.

Atrial fibrillation is among the most prevalent arrhythmias affecting more than 35 million people in the world. The main risk linked to atrial fibrillation is vascular cerebral stroke caused by blood clots created in cardiac chambers. The first line of treatment against blood clots remains anticoagulant drugs. However, long-term oral anticoagulation is contraindicated for some patients.

Another treatment is closure of the left atrial appendage. Typically, an LAA occlusion procedure is performed via a transseptal approach that requires both fluoroscopy and direct intravenous injection of iodine-based contrast in the left atrium. Under fluoroscopy, contrast injection is typically required to assess the geometry of the LAA, ensure appropriate positioning of the LAA occlusion device, and verify that occlusion of the LAA is achieved. However, contrast may be a nephrotoxin that is harmful to the kidneys. Furthermore, x-rays used in fluoroscopy are associated with potential harm to both patients and operating room personnel exposed to the x-rays.

Accordingly, it would be advantageous to reduce the dependence on fluoroscopy, including fluoroscopy with contrast, during intravascular procedures, including LAA occlusion procedures.

SUMMARY

The appended claims may serve as a summary.

DETAILED DESCRIPTION

Figure 1:
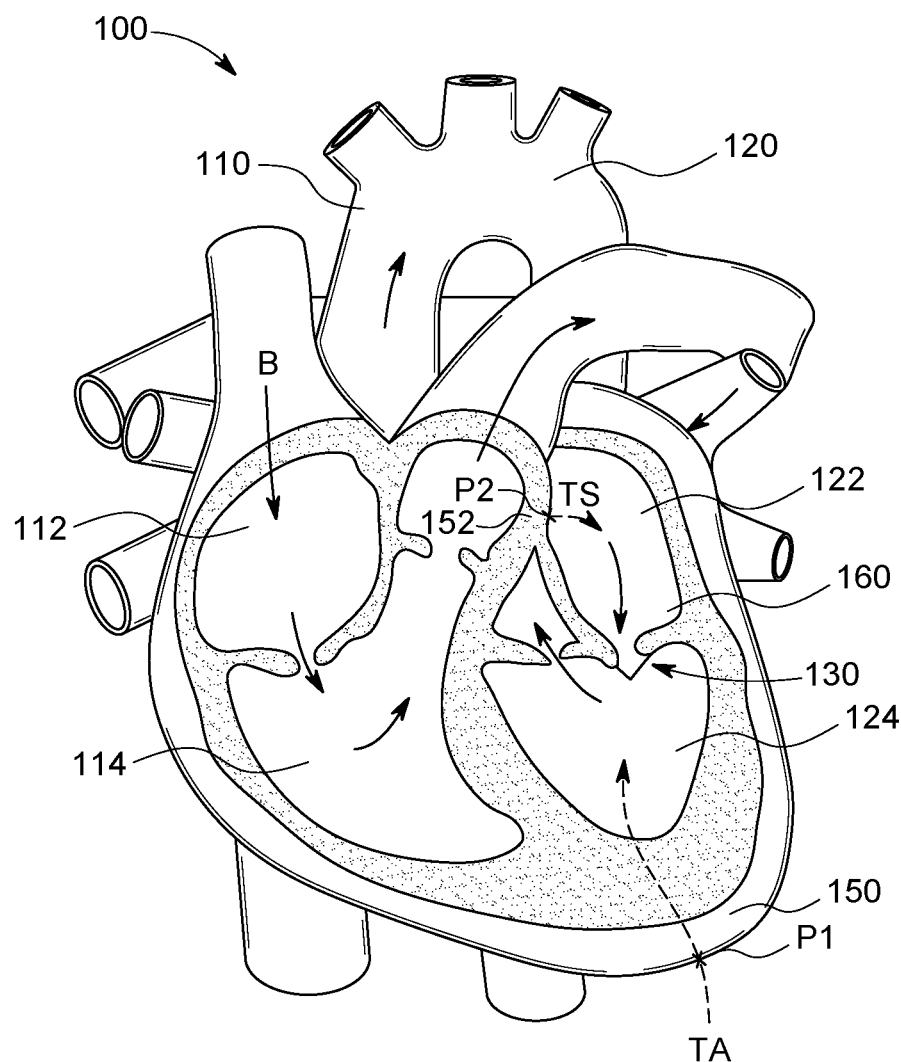
FIG. 1 is a schematic cutaway view of a human heart showing an example transapical delivery approach and an example transseptal delivery approach.

In the following description, numerous specific details are set forth in order to provide a thorough understanding of the disclosure. It will be apparent, however, that the embodiments may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

As used herein, the term "proximal," when used in connection with a delivery device or components of a delivery device, refers to the end of the device closer to the user of the device when the device is being used as intended. On the other hand, the term "distal," when used in connection with a delivery device or components of a delivery device, refers to the end of the device farther away from the user when the device is being used as intended. In some instances, the terms "proximal" and "distal" may be arbitrarily assigned to facilitate understanding of the disclosure, and such instances will be readily apparent to the skilled artisan. As used herein, the terms "substantially," "generally," "approximately," and "about" are intended to mean that slight deviations from absolute are included within the scope of the term so modified.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and do not imply an ordering, timing, or any other characteristic of the referenced items unless otherwise specified; the term "and/or" as used herein refers to and encompasses any and all possible combinations of one or more of the associated listed items; and the terms "comprises" and/or "comprising" specify the presence of stated features, but do not preclude the presence or addition of one or more other features.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based cluster of computers, virtual machine instances, and/or other computing devices. A computer system may include another computer system, and a computing device may belong to two or more computer systems. Any reference to a "computer system" may mean one or more computers, unless expressly stated otherwise. When a computer system performs an action, the action is performed by one or more computers of the computer system.

A "computing device" may be a computer system, hardware, and/or software stored in, or coupled to, a memory and/or one or more processors on one or more computers. As an alternative or addition, a computing device may comprise specialized circuitry. For example, a computing device may be hardwired or persistently programmed to support a set of instructions to perform the functions discussed herein. A computing device may be a standalone component, work in conjunction with one or more other computing devices, contain one or more other computing devices, and/or belong to one or more other computing devices.

A "component" may be hardware and/or software stored in, or coupled to, a memory and/or one or more processors on one or more computers. As an alternative or addition, a component may comprise specialized circuitry. For example, a component may be hardwired and/or persistently programmed with a set of instructions to perform the functions discussed herein. A component may be a standalone component, work in conjunction with one or more other components, contain one or more other components, and/or belong to one or more other components.

The present disclosure is directed to an intravascularly delivered device and/or devices, systems, and methods for delivering, positioning, and/or deploying an intravascularly delivered device. Throughout this disclosure, many examples are described in the context of an LAA occlusion device. One of skill in the art will understand, however, that the described components, features, and principles may also be utilized in other applications. For example, at least some of the embodiments described herein may be utilized for delivering, positioning, and/or deploying an artificial valve for replacing a pulmonary, aortic, or tricuspid valve. Moreover, it will be understood that at least some of the embodiments described herein may be utilized in conjunction with other intravascularly delivered devices, including occlusion devices, valve repair devices, annuloplasty devices, clip devices, and other intravascularly delivered devices not necessarily configured as an LAA occlusion device. Notwithstanding such alternative applications, preferred embodiments described herein are configured to address challenges particularly associated with delivering, positioning, and deploying an LAA occlusion device. The embodiments described below are therefore particularly useful for meeting the additional procedural challenges associated with LAA occlusion through an intravascular approach.

One aspect of the disclosure is directed to a medical navigation system for an intravascular procedure, the medical navigation system comprising: a delivery device comprising a catheter; an intravascularly delivered device configured to be releasably disposed in the catheter for deployment at a target site of a patient, the intravascularly delivered device comprising a plurality of electrodes, the plurality of electrodes including at least one indicator electrode and at least one reference electrode configured to not contact tissue when the intravascularly delivered device is deployed at the target site; and a navigation computer system configured to be electrically coupled with the plurality of electrodes, the navigation computer system comprising one or more processors and at least one memory storing instructions that, when executed by the one or more processors, cause the one or more processors to: control a drive source to transmit current to the plurality of electrodes; collect electrode data corresponding to the plurality of electrodes; monitor impedance corresponding to the at least one indicator electrode based on the electrode data; and determine that the at least one indicator electrode has made contact with the tissue based on the electrode data In some examples, the intravascularly delivered device is an LAA occlusion device, the target site is an LAA of the patient, and the tissue is an LAA wall. As an alternative or addition, the LAA occlusion device includes a disc at a proximal end of the LAA occlusion device; and the at least one indicator electrode is disposed on an edge surface of the disc. As an alternative or addition, the plurality of electrodes includes at least two indicator electrodes disposed on the edge surface of the disc that are about evenly spaced around the edge surface. As an alternative or addition, the LAA occlusion device includes a lobe at a distal end of the LAA occlusion device; and the at least one indicator electrode is disposed on a side surface of the lobe. As an alternative or addition, the at least one electrode is disposed on a distal edge of the side surface of the lobe. As an alternative or addition, the at least one electrode is disposed on a proximal edge of the side surface of the lobe. As an alternative or addition, the at least one electrode is disposed between a distal edge and a proximal edge of the side surface of the lobe.

In some examples, the at least one indicator electrode includes a first indicator electrode expected to make contact with the tissue when the intravascularly delivered device is deployed at the target site.

In some examples, the instructions, when executed by the one or more processors, cause the one or more processors to evaluate a degree of contact between the at least one indicator electrode and the tissue based on electrode data corresponding to the at least one reference electrode and the at least one indicator electrode.

In some examples, evaluating a degree of contact between the at least one indicator electrode and the tissue includes subtracting electrode signals corresponding to the at least one reference electrode from electrode signals corresponding to the at least one indicator electrode and analyzing an amplitude of a resulting signal.

In some examples, the at least one indicator electrode includes a second indicator electrode expected not to make contact with the tissue when the intravascularly delivered device is deployed at the target site. As an alternative or addition, the instructions, when executed by the one or more processors, cause the one or more processors to generate a warning notification when the second indicator electrode makes contact with the tissue.

In some examples, the at least one indicator electrode includes a third indicator electrode expected not to make contact with the tissue when the intravascularly delivered device is deployed at the target site; and the third indicator electrode is disposed on a distal tip of the LAA occlusion device.

In some examples, the navigation computer system monitors impedance corresponding to the at least one indicator electrode based on electrode data generated based on three pairs of electrodes disposed on a surface of the patient during the intravascular procedure.

In some examples, the instructions, when executed by the one or more processors, cause the one or more processors to: determine a position and an orientation of the intravascularly delivered device based on electrode data corresponding to the plurality of electrodes; and cause a display communicatively coupled to the navigation computer system to display a representation of the intravascularly delivered device relative to a representation of an anatomy of the patient. As an alternative or addition, the representation of the anatomy of the patient is based on a 3D model of the anatomy of the patient generated prior to the intravascular procedure.

In some examples, the catheter is a steerable catheter comprising a second plurality of electrodes disposed on a distal end of the steerable catheter; and the instructions, when executed by the one or more processors, cause the one or more processors to: determine a location of each of the plurality of electrodes; determine a configuration and location of the distal end of the steerable catheter; and cause a display communicatively coupled to the navigation computer system to display a representation of the distal end of the steerable catheter device relative to the anatomy of the patient.

In some implementations, the various techniques described herein may achieve one or more of the following advantages: procedural safety of an intravascular procedure, such as an LAA occlusion procedure, is increased; the use of fluoroscopy and/or contrast injection is reduced and/or eliminated; an intravascularly delivered device and/or a delivery device can be located to facilitate navigation for deployment and/or positioning; pressure exerted by an intravascularly delivered device on tissue, such as the pressure exerted by an LAA occlusion device on the LAA wall, can be quantified while positioning the intravascularly delivered device; and electrode data may provide standardized metrics for quantifying satisfactory deployment of an intravascularly delivered device. Additional features and advantages are apparent from the specification and the drawings.

General Overview

The present disclosure aims at providing systems, devices, device modifications, and/or methods for navigating the vascular network and/or cardiac chamber of a patient in order to perform a diagnosis and/or deliver intravascularly delivered devices, such as but not limited to guidewires, delivery sheaths, closure devices, valve repair devices, valve replacement devices, and/or other intravascularly delivered devices. The techniques described herein may be used to reduce and/or eliminate the use of fluoroscopy and/or contrast medium (including iodine-based contrast medium) and collect additional physiological data during procedures.

An intravascularly delivered device, such as an LAA occlusion device, includes a plurality of electrodes disposed on a surface of the intravascularly delivered device. A medical navigation system may use the plurality of electrodes to determine a position and/or condition of the intravascularly delivered device during navigation of the vasculature to a target site, such as the LAA. The medical navigation system may use the plurality of electrodes to determine a position and/or condition of the intravascularly delivered device during navigation of the vasculature to a target site, such as the LAA. The medical navigation system may use the plurality of electrodes to evaluate contact between the intravascularly delivered device and tissue at the target site, such as a wall of the LAA. A delivery device may include a second plurality of electrodes disposed on a surface of a distal end of the delivery device. The medical navigation system may use the plurality of electrodes to determine a position and/or condition of the distal end of the delivery device during navigation of the vasculature to a target site.

FIG. 1 is a schematic cutaway view of a human heart 100. The human heart includes two atria and two ventricles: the right atrium 112 and the left atrium 122, and the right ventricle 114 and the left ventricle 124. The heart 100 further includes the aorta 110 and the aortic arch 120. The mitral valve 130 is positioned between the left atrium 122 and the left ventricle 124. The mitral valve 130, also known as the bicuspid valve or left atrioventricular valve, is a dual-flap that opens as a result of increased pressure within the left atrium 122 compared to the left ventricle 124. After the left atrium 122 has filled and begins to contract, pressure in the left atrium 122 increases above that in the left ventricle 124, causing the mitral valve 130 to open such that blood passes toward the left ventricle 124. Blood typically flows through the heart 100 in the antegrade direction shown by arrows "B". Adjacent to the mitral valve 130 is the LAA 160, which empties into the left atrium 122.

A dashed arrow, labeled TA, indicates an example transapical approach for treating or replacing heart tissue. In the transapical delivery of an LAA occlusion device (e.g., LAA occlusion device 30) to the LAA 160, a small incision is made between the ribs and into the apex of the left ventricle 124 at position P1 in the heart wall 150 to deliver the LAA occlusion device 30 to the LAA 160. An alternative path, shown with a second dashed arrow labeled TS, indicates an example transseptal approach with an incision made through the interatrial septum 152 of the heart 100 from the right atrium 112 to the left atrium 122 at position P2. In a transseptal approach, the delivery system may enter the patient through the jugular vein (not shown), proceed through the superior vena cava (shown but not labeled in FIG. 1) and into the right atrium 112, pierce the interatrial septum 152 into the left atrium 122 and approach the LAA 160. More typically, in a transseptal approach, the delivery system may enter the patient through the femoral vein (not shown), proceed through the inferior vena cava (shown but not labeled in FIG. 1) and into the right atrium 112, at which point the procedure is generally the same as described above for the approach from the superior vena cava.

Figure 2:
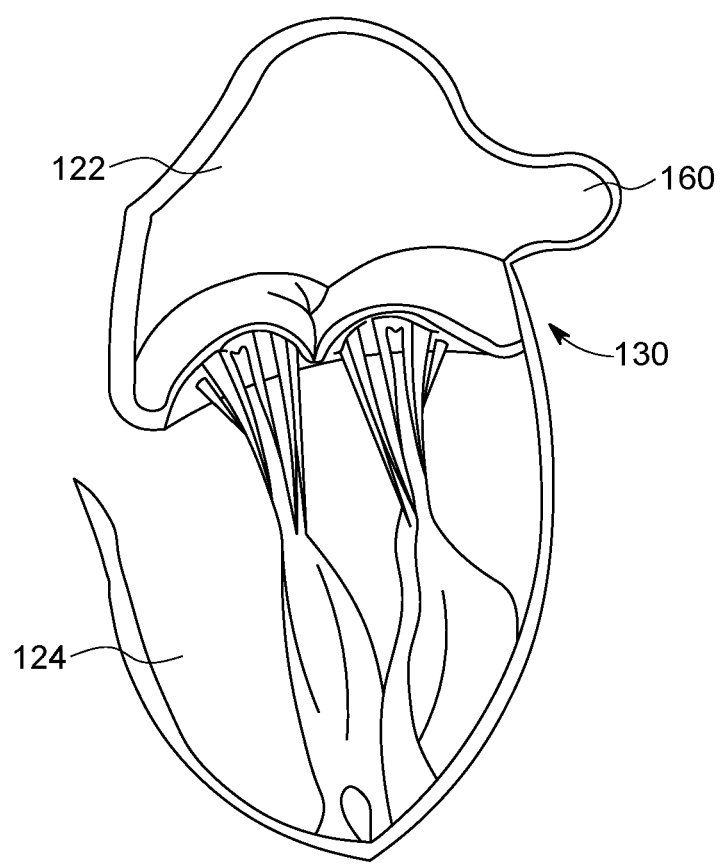
FIG. 2 is a schematic representation of the mitral valve, left atrial appendage, and associated structures during normal operation of the heart.

FIG. 2 is a more detailed schematic representation of the left atrium 122 and the left ventricle 124, more closely illustrating the LAA 160. During normal function, the LAA 160 contracts rhythmically along with the left atrium 122 and blood from the LAA 160 is ejected into the left atrium, then passes through the mitral valve 130 into the left ventricle 124. With each cycle, blood in the LAA 160 is completely emptied out and the mitral valve 130 prevents backflow from the left ventricle 124 to the left atrium 122.

In some patients (e.g., older patients), the right atrium 112 and the left atrium 122 of the heart 100 may not beat regularly, a condition known as atrial fibrillation. In some instances, this may result in partial or incomplete ejection of blood from the LAA 160. Stagnant blood in the LAA 160 may form clots, which can ultimately travel to the brain and cause a stroke. To prevent stagnant blood from remaining in and clotting in the LAA 160, an LAA occlusion device can be inserted as a plug in the cavity of the LAA 160.

Example LAA Occlusion Device

Figure 3A:
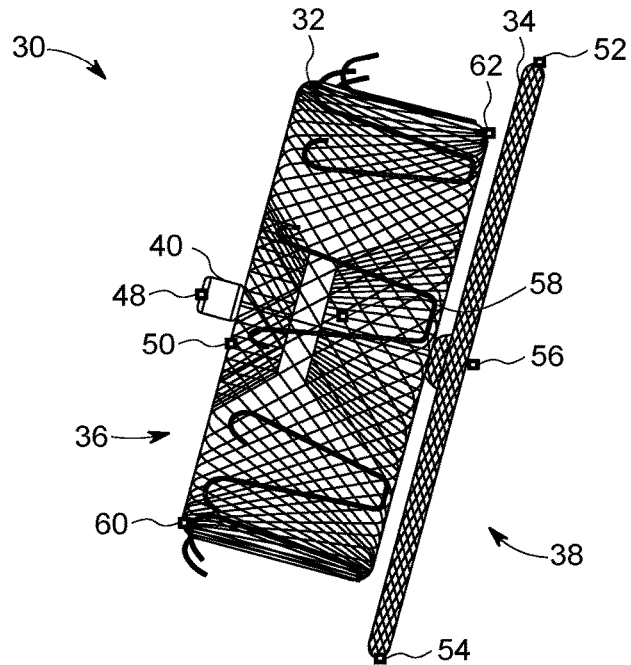
FIGS. 3A-3C illustrate an example LAA occlusion device.

FIG. 3A illustrates an example LAA occlusion device 30. In an LAA occlusion procedure, the LAA occlusion device 30 is deployed in the LAA 160 to reduce the risk of stroke due to atrial fibrillation. The LAA occlusion device 30 includes a disc 34 disposed at a proximal end 38 of the LAA occlusion device 30 and a lobe 32 disposed at a distal end 36 of the LAA occlusion device 30. The lobe 32 is shaped and sized to fit snugly within LAA 160 when fully expanded, and the disc 34 is shaped and sized to cover the opening (or ostium) leading into the LAA 160 when fully expanded.

That is, the lobe 32 preferably has an outer diameter in the fully expanded condition that is larger than the interior diameter of LAA 160 such that the lobe 32 is frictionally held in the LAA 160. Similarly, the disc 34 preferably has an outer diameter in the fully expanded condition that is larger than the interior diameter of the ostium of the LAA 160 such that the disc 34 fully covers the opening that leads into the LAA 160. The lobe 32 and the disc 34 may be formed from a mesh including a plurality of strands, wherein at least one strand may be a metal strand. The strands may be braided, interwoven, or otherwise combined to define a generally tubular mesh. While the illustrated embodiment shows the lobe 32 and the disc 34 of the LAA occlusion device 30 in an expanded state, the LAA occlusion device 30 preferably is formed of a shape-memory material (e.g. a nickel-titanium alloy such as nitinol) that enables it to be compressed within a delivery device and to return to its expanded shape when released from the delivery device. A connective element may connect the proximal end of the lobe 32 to the disc 34. The connective element may be configured such that the lobe 32 and the disc 34 are articulable, rotatable, or otherwise movable with respect to the connective element and/or each other. The disc 34 and/or lobe 32 may include one or more fabrics or other materials within the braided mesh, and these fabrics or other materials may help promote tissue Ingrowth and/or sealing after implantation of the LAA occlusion device 30.

Figure 5:
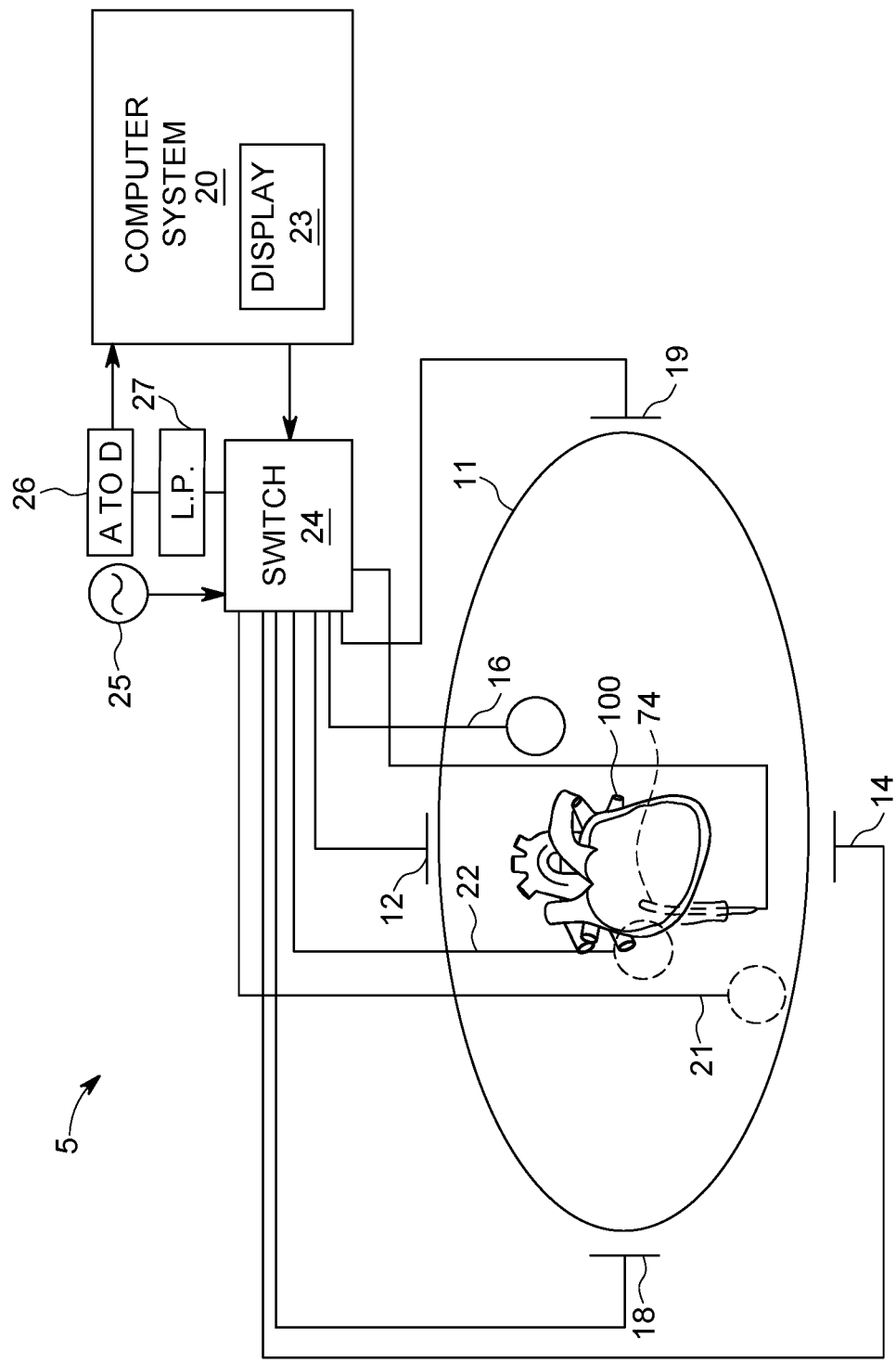
FIG. 5 is a schematic diagram of an example medical navigation system.

A plurality of electrodes (e.g., electrodes 48, 50, 52, 54, 56, 58, 60, 62) are disposed on a surface of the LAA occlusion device 30. While eight electrodes are illustrated, the plurality of electrodes 48-62 may include any number of electrodes. An electrode is an electrical conductor used to establish electrical contact with and/or carry an electric current into a non-metallic component of a circuit, such as cardiac tissue within the heart 100. A medical navigation system (e.g., medical navigation system 5; FIG. 5) uses the plurality of electrodes 48-62 to determine their position, and hence the position of the LAA occlusion device 30 based on electrode data collected from the plurality of electrodes 48-62. As an addition or alternative, the medical navigation system may use the plurality of electrodes 48-62 to evaluate contact between the LAA occlusion device 30 and cardiac tissue, such as a wall of the LAA 160.

The plurality of electrodes 48-62 are configured to be electrically coupled to a drive source, such as the signal generator 25 of the medical navigation system 5 of FIG. 5. In some embodiments, one or more wires (not shown) of the LAA occlusion device 30 electrically couple one or more of the plurality of electrodes 48-62 to one or more wires (not shown) of a delivery device (e.g., delivery device 70). The one or more wires of the delivery device may electrically couple the plurality of electrodes 48-62 to the medical navigation system, which is configured to drive the electrodes 48-62 and collect electrode data therefrom. An example medical navigation system is described in greater detail hereinafter.

Figure 3B:
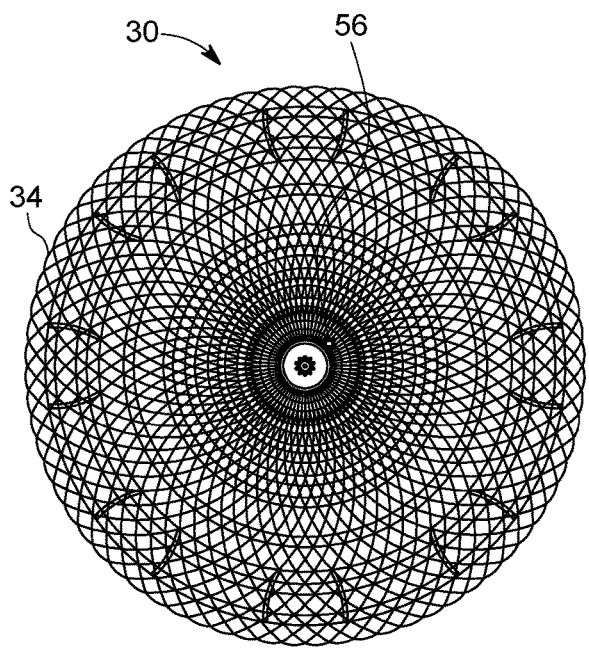
Figure 3C:
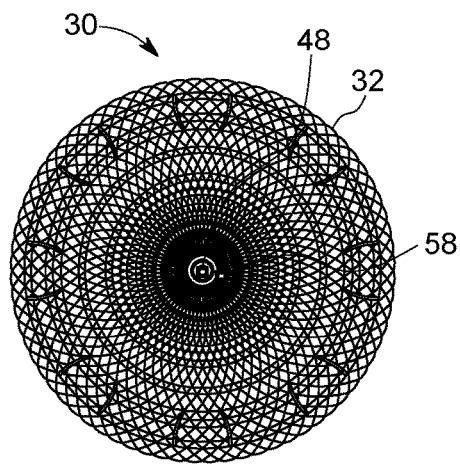

The plurality of electrodes 48-62 may include one or more electrodes 48-50 disposed on a distal surface of the LAA occlusion device 30. As an alternative or addition, the plurality of electrodes 48-62 may include one or more electrodes 52-54 disposed on an edge surface (e.g., a radially outer edge surface) of the disc 34. As an alternative or addition, the plurality of electrodes 48-62 may include one or more electrodes 56 disposed on a proximal surface of the LAA occlusion device 30. As an alternative or addition, the plurality of electrodes 48-62 may include one or more electrodes 58-62 disposed on a side surface (e.g., a radially outer side surface) of the lobe 32. As an alternative or addition, the plurality of electrodes 48-62 may include one or more other electrodes disposed on another surface of the LAA occlusion device 30. FIG. 3B illustrates the proximal end of the example LAA occlusion device 30, including an electrode 56 disposed on the proximal surface of the LAA occlusion device 30 at or near the radial center of the disc 34. FIG. 3C illustrates the distal end of the example LAA occlusion device 30. Electrode 48 is disposed on the distal tip of the LAA occlusion device 30, such as on the distal screw or clamp 40 of the LAA occlusion device 30. Electrode 50 is disposed adjacent to the base of the distal screw or clamp 40.

The LAA occlusion device 30 may include one or more insulation barriers between one or more of the plurality of electrodes 48-62 and one or more metallic components of the LAA occlusion device 30. As an alternative or addition, one or more conductive elements of the LAA occlusion device 30 may function as one or more of the plurality of electrodes 48-62, such as by electrically coupling the conductive element to a drive source with an isolated electrical wire. For example, one or more stabilizing wires of the LAA occlusion device 30 may be converted into an electrode. In some embodiments, a distal screw or clamp 40, positioned at or near the radial center of the distal surface of the LAA occlusion device 30, is converted into an electrode 48. As an alternative or addition, an electrode 48 at about the radial center of the distal surface of the LAA occlusion device 30 is positioned at or near the distal screw or clamp 40.

In some examples, the plurality of electrodes 48-62 includes one or more reference electrodes. A reference electrode, also referred to as the 'indifferent electrode', has a stable and/or known electrode potential. Data collected from a reference electrode may be used to obtain an accurate measurement using data collected from another electrode typically referred to as an indicator electrode, also referred to as a recording electrode. The usage of a reference electrode for analyzing electrode data is described in greater detail hereinafter.

Example Delivery Device

Figure 4A:
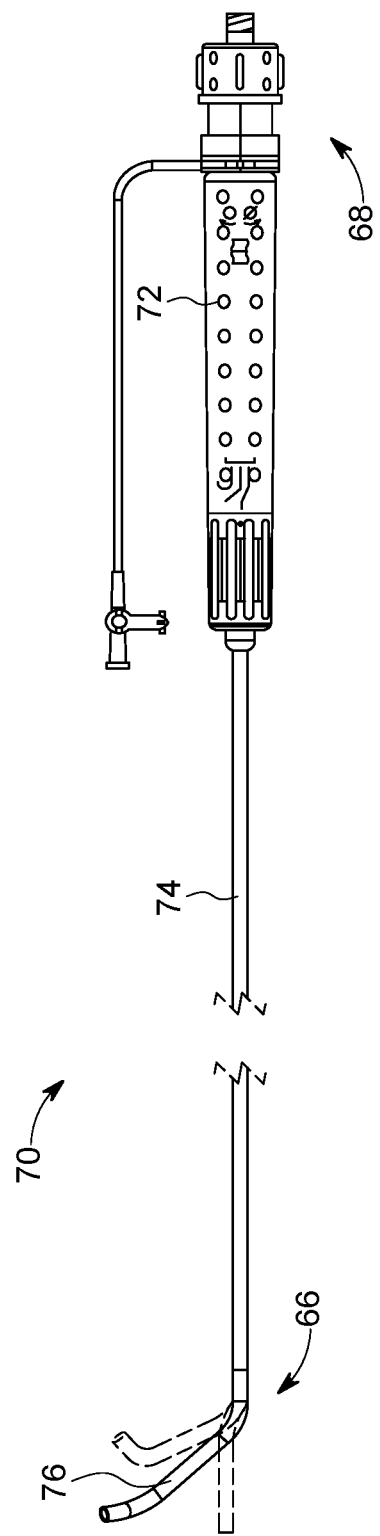
FIGS. 4A-4B illustrate an example delivery device.

FIG. 4A illustrates an example delivery device 70. The example delivery device 70 includes a handle 72 at a proximal end 68 of the example delivery device 70. In some embodiments, the example delivery device 70 is configured to deliver an LAA occlusion device 30 to the vicinity of LAA 160 for deployment into the LAA 160. As an addition or alternative, the delivery device 70 may be tailored to deliver any other intravascularly delivered device. The example delivery device 70 includes a catheter 74 that extends between a distal end 66 and the handle 72 of the example delivery device 70, wherein the handle 72 remains outside the patient. In some embodiments, the catheter 74 is a steerable catheter with a flexible, steerable catheter tip 76 at the distal end 66 of the delivery device 70. The catheter 74 has a lumen therethrough that allows the LAA occlusion device 30 to be passed through the delivery device in a compressed configuration.

The lumen of the catheter 74 may further accommodate an inner rod that terminates in a plunger that is used to deploy the LAA occlusion device 30 by translating the LAA occlusion device 30 distally from the catheter 74. As an alternative or addition, the catheter 74 may include a delivery sheath that is retracted to expose and deploy the LAA occlusion device 30. As an alternative or addition, the delivery device 70 may include another structure for translating the LAA occlusion device 30 out from the catheter 74, such as a magnet, a fastener, a blunt tip, or any other suitable mechanism. In some embodiments, a push rod or wire terminates in a threaded tip that is threadedly coupled to a threaded fastener at the radial center of the proximal disc 34. In these embodiments, the push rod may be pushed through the delivery device to push the LAA occlusion device 30 through the delivery device, and the LAA occlusion device 30 may remain threadedly coupled to the push rod until the push rod is rotated to decouple the threaded tip of the push rod from the threaded fastener of the LAA occlusion device 30. The catheter 74 may be formed of any known material for building catheters, including biocompatible polymers and/or metals such as stainless steel. Prior to deployment from the catheter 74, the LAA occlusion device 30 is contained within the lumen of catheter 74 in a compressed configuration. When the distal end 66 of the delivery device 70 is properly positioned relative to the LAA 160, the LAA occlusion device 30 may be urged forward through the catheter 74.

Figure 4B:
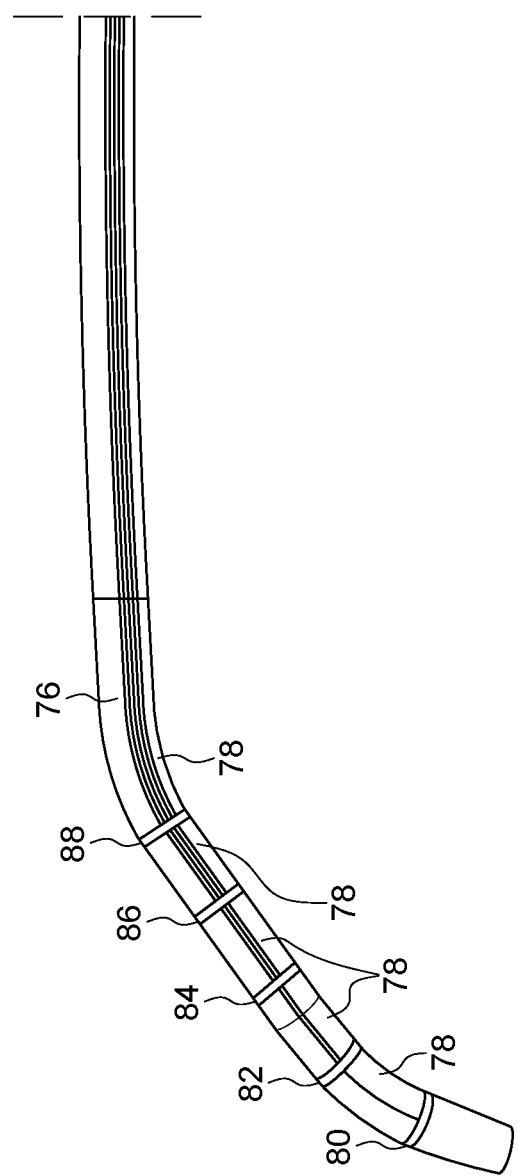

FIG. 4B illustrates a distal portion of the catheter 74 that includes the catheter tip 76. A plurality of electrodes (e.g., electrodes 80, 82, 84, 86, 88) are disposed on a surface of the catheter tip 76. While five electrodes 80-88 are illustrated, the plurality of electrodes 80-88 may include two, three, four, six, or any number of electrodes. In some embodiments, one or more of the plurality of electrodes 80-88 have a ring shape that circumscribes the catheter 74. The plurality of electrodes 80-88 may be spaced evenly over a range of the catheter tip 76, such as about 10 mm apart from each other.

A medical navigation system (e.g., medical navigation system 5) uses the plurality of electrodes 80-88 to determine an electrode location in three dimensions for each of the plurality of electrodes 80-88. The medical navigation system can determine the position and/or configuration of the catheter tip 76 in the heart 100 based on the electrode locations. In some embodiments, when the catheter tip 76 is steerable, the specific configuration of the steerable catheter tip 76 may be determined.

In some embodiments, one or more wires 78 of the delivery device 70 electrically couple one or more of the plurality of electrodes 80-88 to a drive source, such as a drive source controlled by a navigation computer system of the medical navigation system. In some embodiments, the one or more wires 78 include a separate wire connected to each of the plurality of electrodes 80-88. The one or more wires of the delivery device 70 may electrically couple the plurality of electrodes 80-88 to the navigation computer system, which is configured to drive the electrodes and collect data therefrom. The lumen of the catheter 74 may house one or more wires running from the plurality of electrodes 80-88 at the distal end of the catheter 74 through the proximal end of the catheter 74, which may also run through at least a portion of the handle 72. As an addition or alternative, the lumen of the catheter 74 may house one or more wires configured to be electrically coupled to the plurality of electrodes 48-62 of the LAA occlusion device 30. Such wires may run from one or more electrical contacts at the distal end 66 of the delivery device 70 through the proximal end of the catheter 74, which may also run through at least a portion of the handle 72. In some embodiments, the wires may run along the outer surface of the catheter 74, and/or through a wall of the catheter, in addition or as an alternative to running through the lumen of the catheter 74. While a lumen of the catheter 74 is described herein, the catheter may comprise one or multiple lumens, any of which may function as described herein. For example, a secondary lumen of the catheter 74 may house the one or more wires as described herein.

Example Medical Navigation System

FIG. 5 is a schematic diagram of an example medical navigation system. The medical navigation system 5 provides non-fluoroscopic navigation during an intravascular procedure. A patient 11 is schematically depicted as an oval for clarity. When electrical current is applied across two surface electrodes of a pair of electrodes, a voltage gradient is created along the axis between the electrodes. Three sets of surface or patch electrodes are shown as a first pair of electrodes 18, 19 along a Y-axis; a second pair of electrodes 12, 14 along an X-axis; and a third pair of electrodes 16, 22 along a Z-axis. The X-axis, Y-axis, and Z-axis form three orthogonal axes (X-Y-Z). The patient 11 may be positioned such that the patient's heart 100 is generally near the center between one or more pairs of the electrodes. Patch electrode 16 is disposed on a front surface of the patient 11 that is closest to the reader viewing FIG. 5, and patch electrode 22 is shown in outline form to show its placement on a back surface of the patient 11. The heart 100 of patient 11 lies between these various sets of patch electrodes 18, 19, 12, 14, 16, 22. An additional patch electrode 21, which may be referred to as a "belly" patch, "ground patch", or "reference patch", is also illustrated. Each patch electrode 18, 19, 12, 14, 16, 22, 21 is independently connected to a multiplex switch 24. During an intravascular procedure, the patient 11 may have most or all of a conventional surface 12-lead ECG system (not shown) in place, and this ECG information may be available to the navigation computer system 20.

Each patch electrode 18, 19, 12, 14, 16, 22, 21 is coupled to the switch 24, and pairs of electrodes (18, 19), (12, 14), and (16, 22) are selected by software running on the navigation computer system 20, which couples these electrodes 18, 19, 12, 14, 16, 22 to the signal generator 25. A pair of electrodes, for example electrodes 18 and 19, may be excited by the signal generator 25 and they generate a field in the body of the patient 11, including the heart 100. During the delivery of a current pulse, the remaining patch electrodes 12, 14, 16, 22 are referenced to the belly patch electrode 21, and the voltages impressed on these remaining electrodes 12, 14, 16, 22 are measured. A suitable low pass filter 27 or software processes the voltage measurements to remove electronic noise and cardiac motion artifact from the measurement signals. The filtered voltage measurements are transformed to digital data by the analog-to-digital or A-to-D converter 26. As an addition or alternative, other signal processing methods may be employed. In this fashion, the various patch electrodes 18, 19, 12, 14, 16, 22 are divided into driven and non-driven electrode sets. While a pair of electrodes is driven by the signal generator 25, the remaining non-driven electrodes are used as references to synthesize the orthogonal drive axes.

The belly patch electrode 21 is seen in the figure as an alternative to a fixed intra-cardiac electrode. In many instances, a coronary sinus electrode or another fixed electrode in the heart 100 can be used as a reference for measuring voltages and displacements. All of the raw patch voltage data is measured by the A-to-D converter 26 and stored in the navigation computer system 20 under the direction of software. This electrode excitation process occurs rapidly and sequentially as alternate sets of patch electrodes 18, 19, 12, 14, 16, 22 are selected, and the remaining members of the set are used to measure voltages.

This collection of voltage measurements may be referred to herein as the "patch data set." The software has access to each individual voltage measurement made at each individual patch electrode 18, 19, 12, 14, 16, 22 during each excitation of each pair of electrodes 18, 19, 12, 14, 16, 22.

The raw patch data is used to determine the "raw" location in three spaces (X, Y, Z) of the electrodes inside the heart 100, such as the plurality of electrodes 48-62 of the LAA occlusion device 30 and/or the plurality of electrodes 80-88 of the delivery device 70. This process is also referred to as "triangulation." Triangulation is the process of determining the location of a point by measuring angles from known points. Optical three-dimensional measuring systems use triangulation networks in order to determine spatial dimensions and geometry of objects. Output of at least two of the sensors is considered the point on an object's surface which define a spatial triangle. Within this triangle, the distance between the sensors is the base and is known. By determining the angles between the sensors and the base, the intersection point, and thus the 3D coordinate, is calculated from the triangular relations.

In some embodiments, the navigation computer system 20 controls the signal generator 25 to send an electrical signal through each pair of electrodes (18, 19), (12, 14), and (16, 22) to create a voltage gradient along each of the three axes X, Y and Z, forming a transthoracic electrical field. When the catheter 74 enters the transthoracic electrical field, each catheter electrode 80-88 can sense voltage, timed to the creation of the gradient along each axis. Using electrode data collected from the catheter electrodes 80-88 compared to the voltage gradient on all three axes, the navigation computer system 20 may calculate the three-dimensional position of one or more catheter electrodes 80-88. As an alternative or addition, when the LAA occlusion device 30 enters the transthoracic electrical field, each LAA occlusion device electrode 48-62 can sense voltage, timed to the creation of the gradient along each axis. Using electrode data collected from the LAA occlusion device electrodes 48-62 compared to the voltage gradient on all three axes, the navigation computer system 20 may calculate the three-dimensional position of one or more LAA occlusion device electrodes 48-62. The calculated position for the one or more delivery device electrodes 80-88 and/or LAA occlusion device electrodes 48-62 may be determined simultaneously, and may be performed periodically, such as many times per second.

In some embodiments, the calculated position of one or more delivery device electrodes 80-88 may be used to determine a position and orientation of at least a portion of the delivery device 70, such as but not limited to the catheter tip 76. As an alternative or addition, the calculated position of one or more LAA occlusion device electrodes 80-88 may be used to determine a position and orientation of at least a portion of the LAA occlusion device 30. In some examples, navigation computer system 20 generates an image of the LAA occlusion device 30 and/or the delivery device 70 superimposed on an image of the anatomy of the patient 11. The generated image may be displayed in real-time on a display 23 communicatively coupled with the navigation computer system 20. In some examples, the navigation computer system 20 is provided with a 3D geometry of the anatomy of the patient 11, such as a representation of a portion of the patient's heart 100, and the generated image includes the LAA occlusion device 30 and/or the delivery device 70 superimposed on a view of the 3D geometry.

As an alternative or addition, the medical navigation system 5 may use a navigation node based on magnetic sensors. As an alternative or addition, one or more electrodes on the LAA occlusion device 30 may be replaced by a plurality of magnetic sensors, such as coils that are configured to be electrically coupled with the medical navigation system 5. A magnetic field is created around the patient 11, such as by using a coil housed below the patient 11. When the magnetic sensors are moved within the magnetic field, electrical current is created and detected by the medical navigation system 5.

Example LAA Procedure

The medical navigation system 5 provides guidance for navigating, positioning, and/or deploying an intravascularly delivered device during an intravascular procedure, such as but not limited to an LAA occlusion procedure. FIGS. 6A-6F illustrate stages of an example LAA occlusion device 30 deployment after the catheter tip 76 of the delivery device 70 is positioned in the LAA 160. The delivery device 70 is navigated through the vasculature of the patient using the medical navigation system 5. The navigation may be based on the electrode data corresponding to electrodes 80-88 of the delivery device 70. For example, the catheter tip 76 may be positioned within, adjacent, and preferably coaxial within the LAA based on electrode data displayed by the medical navigation system 5, thus minimizing and/or eliminating the need for fluoroscopy.

Figure 6A:
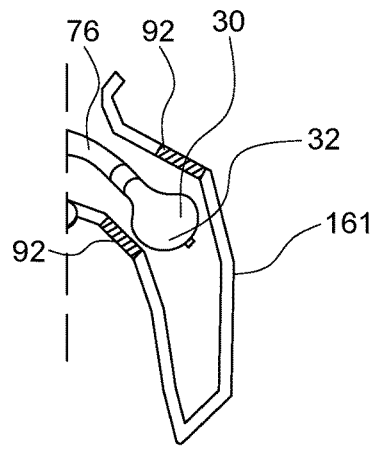
FIGS. 6A-6F illustrate stages of example LAA occlusion procedures.

In FIG. 6A, the LAA occlusion device 30 is partially translated out of the catheter tip 76 such that the lobe 32 of the LAA occlusion device 30 partially expands into a ball configuration. The ball configuration creates an atraumatic distal tip. The delivery device 70 may be subsequently advanced further in the LAA 160 to a desired deployment position relative to the landing zone 92. For example, the landing zone 92 may be an optimal position for the lobe 32 of the LAA occlusion device 30 to be deployed within the LAA 160. The electrode 48 disposed at the distal tip and the electrode 50 disposed adjacent to the distal screw or clamp 40 create a local dipole signal at the distal end of the LAA occlusion device 30. The navigation computer system 20 processes electrode data from electrodes 48-50 to determine the position of the distal screw 40 or clamp in the LAA 160 while reducing and/or eliminating reliance on fluoroscopy or ultrasound imaging. The medical navigation system 5 may display, on the display 23 of the navigation computer system 20 and/or on one or more other displays, navigation guidance information generated based on the electrode data.

When advancing the LAA occlusion device 30 in the ball configuration, minimizing inadvertent contact with the LAA wall 161 is desired. For example, such inadvertent contact may indicate that the LAA occlusion device 30 is too deep in the LAA 160, or that the LAA occlusion device 30 is exerting unwanted pressure against the distal LAA wall 161. In some embodiments, by using electrode 48 as a reference electrode and electrode 50 as an indicator electrode, the navigation computer system 20 can detect inadvertent contact between the distal screw or clamp 40 and the LAA wall 161. FIG. 6E-6F illustrates an impedance field 90 that is detectable by the navigation computer system 20 when the navigation computer system 20 controls the driving of corresponding electrodes 48-50. The navigation computer system 20 can detect inadvertent contact, shown in FIG. 6F, by analyzing electrode data describing the impedance field 90. In some examples, the navigation computer system 20 detects local sharp electrogram cardiac signals and modification of the dipole impedance associated with the corresponding electrodes 48-50.

When such contact is detected at this stage, the navigation computer system 20 may notify the physician operating the delivery device 70 of the contact. For example, electrode data collected by the navigation computer system 20 may include intracardiac electrograms recorded by the indicator electrode 48 and the reference electrode 50. The navigation computer system 20 may generate navigation guidance information regarding inadvertent contact between the distal tip of the LAA occlusion device 30 and the LAA wall 161 at the indicator electrode 48 disposed on the distal screw or clamp 40. For example, the navigation computer system 20 may provide real-time feedback regarding inadvertent contact on a display 23 communicatively coupled to the navigation computer system 20.

Figure 6B:
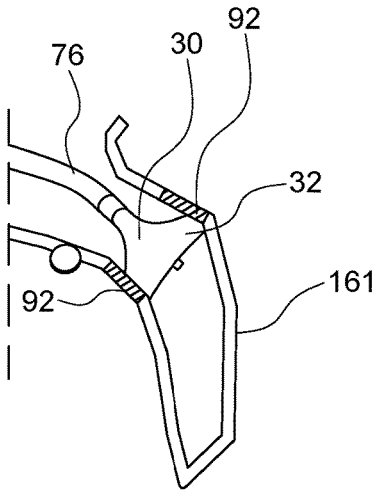
Figure 6C:
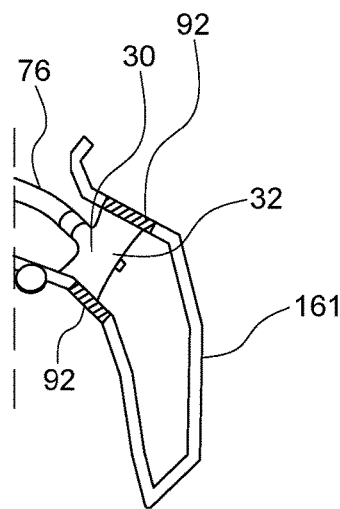

After reaching the desired deployment position relative to the landing zone 92 with the LAA occlusion device 30 in the ball configuration of FIG. 6A, the physician may further deploy the LAA occlusion device 30 such that the lobe 32 first expands into the triangular configuration of FIG. 6B and then fully expands into the cylindrical configuration of FIG. 6C. After the lobe 32 deployment is complete, the electrodes 58-62 disposed on the side surface of the lobe 32 are expected to make contact with the LAA wall 161. In some embodiments, by using the electrodes 58-62 disposed on the side surface of the lobe 32 as indicator electrode/s, the navigation computer system 20 can evaluate contact between the lobe 32 and the LAA wall 161. In some embodiments, electrode 50 is used as a reference electrode for electrodes 58-62. The electrode data collected by the navigation computer system 20 may include intracardiac electrograms recorded by the indicator electrodes 58-62 and the reference electrode 50. The navigation computer system 20 may generate navigation guidance information regarding contact quality between the lobe 32 and the LAA wall 161 at the indicator electrodes 58-62 disposed on the side surface of the lobe 32. For example, the navigation computer system 20 may provide real-time feedback regarding contact quality on a display 23 communicatively coupled to the navigation computer system 20.

Figure 6D:
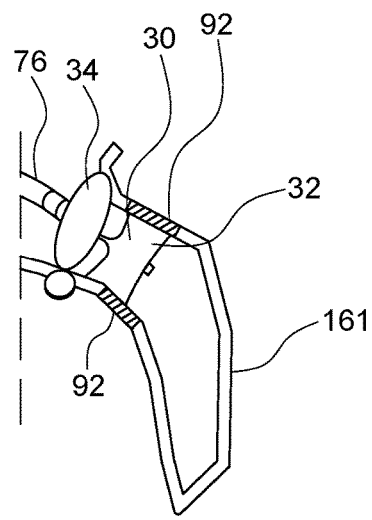
Figure 6E:
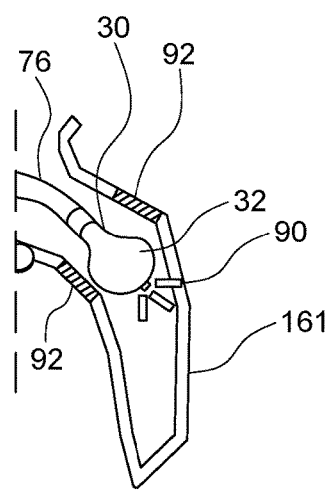
Figure 6F:
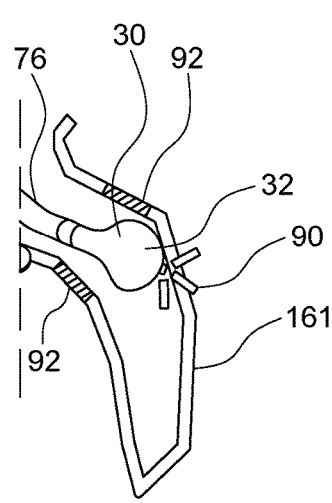

In FIG. 6D, the physician deploys the disc 34 of the LAA occlusion device 30. The completion of the disc 34 deployment allows electrodes 52-56 disposed on a surface of the disc 34 to be exposed. Specifically, the one or more electrodes 52-54 disposed on an edge surface of the disc 34 are expected to make contact with the LAA wall 161. In some embodiments, by using the electrode 56 disposed near the center of the proximal surface of the disc 34 as a reference electrode and one or more electrodes 52-54 disposed on the edge surface of the disc 34 as indicator electrode/s, the navigation computer system 20 can evaluate contact between the disc 34 and the LAA wall 161 at the ostium of the LAA wall 161. When contact is detected at this stage, the navigation computer system 20 may notify the physician operating the delivery device 70 of the contact. The electrode data collected by the medical navigation system 5 may include intracardiac electrograms recorded by the indicator electrodes 52-54 and the reference electrode 50. The navigation computer system 20 may generate navigation guidance information regarding contact quality between the disc 34 and the LAA wall 161 at the indicator electrodes 52-54 disposed on the edge surface of the disc 34. For example, the navigation computer system 20 may provide real-time feedback regarding contact quality on a display 23 communicatively coupled to the navigation computer system 20.

Figure 7A:
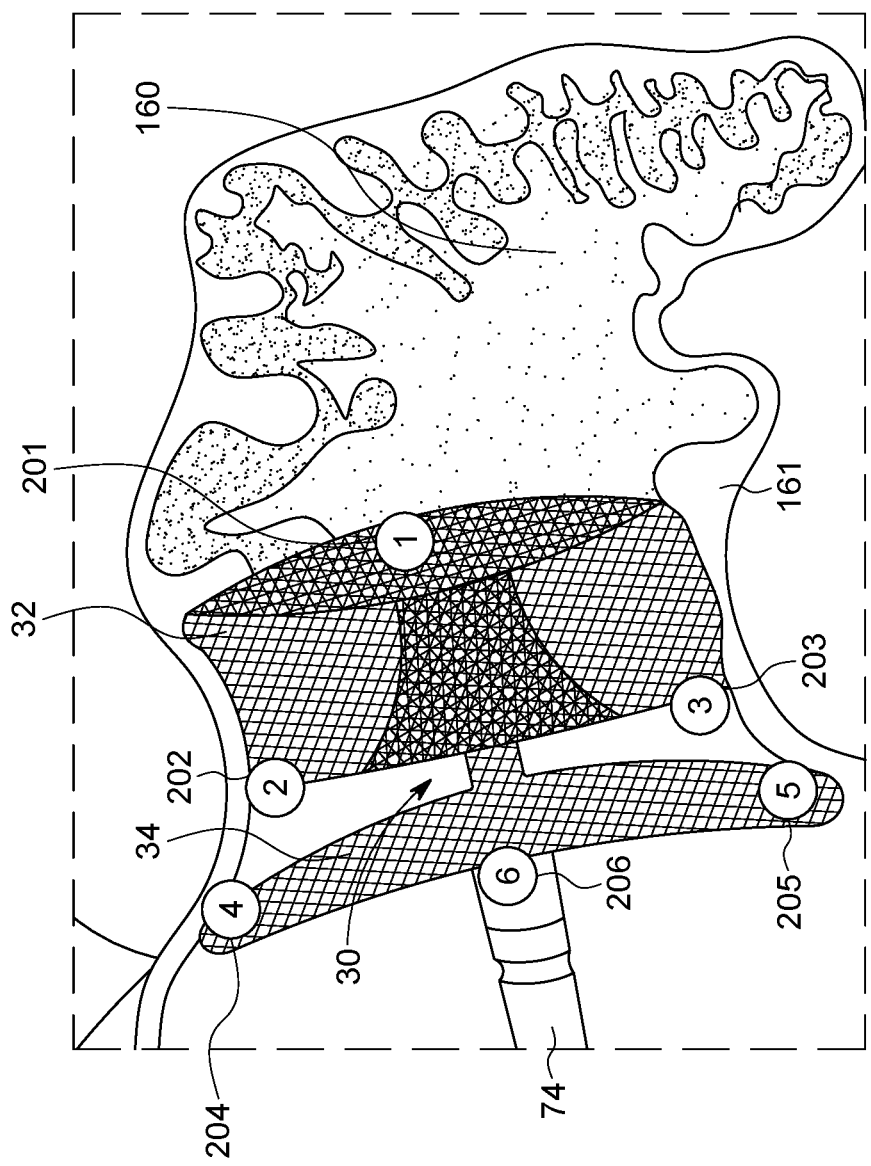
FIGS. 7A-7D illustrate an example set of electrodes disposed on the surface of an example LAA occlusion device and example impedance data corresponding thereto.

A more detailed explanation of evaluating contact quality is provided with respect to FIGS. 7A-7D. FIG. 7A illustrates an example set of electrodes 201-206 disposed on the surface of an example LAA occlusion device 30. Electrode 201 is a reference electrode disposed adjacent to the base of the distal screw or clamp of the LAA occlusion device 30. Electrodes 202-203 are disposed on a side surface of the lobe 32 of the LAA occlusion device 30. Electrodes 204-205 are disposed on an edge surface of the disc 34 of the LAA occlusion device 30. Electrode 206 is a reference electrode disposed near the center of the proximal surface of the disc 34 of the LAA occlusion device 30.

Figure 7B:
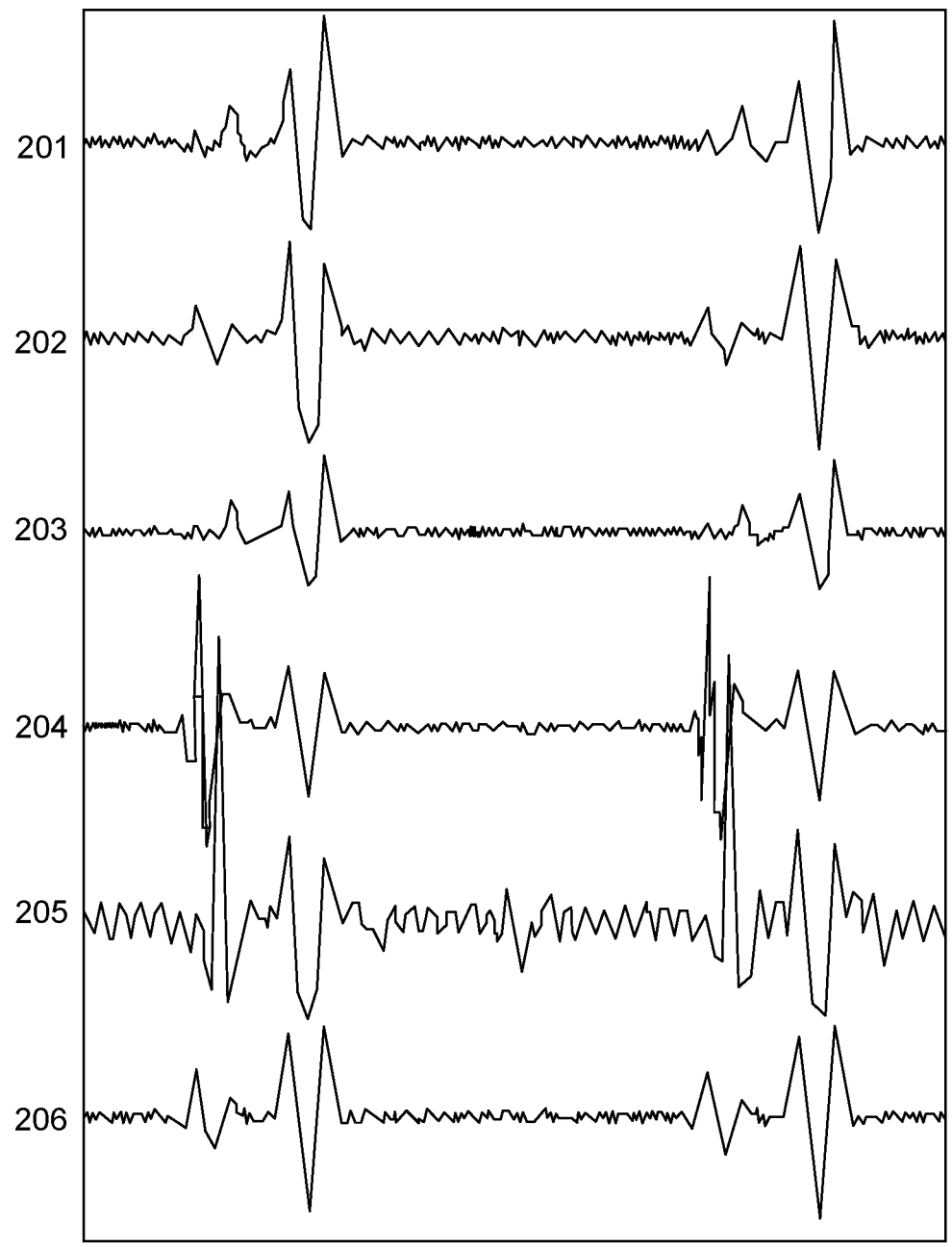
Figure 7C:
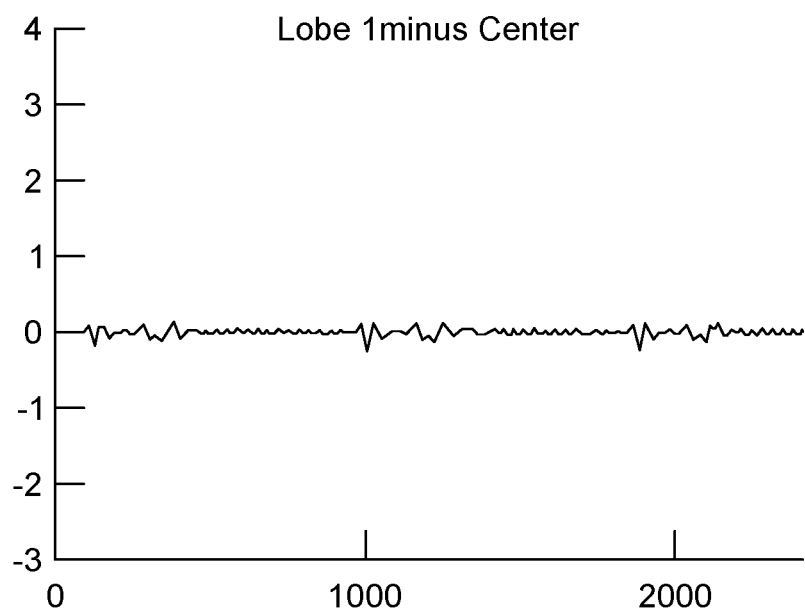
Figure 7D:
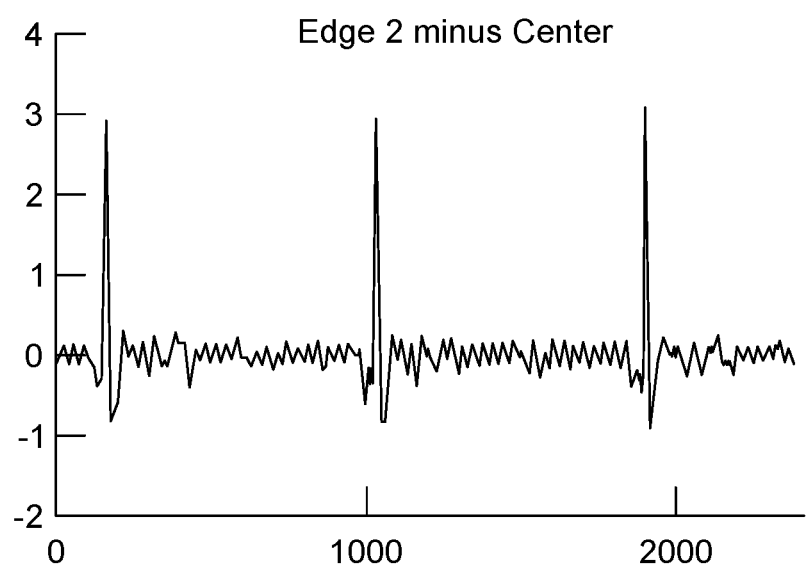

FIG. 7B illustrates example electrocardiogram data corresponding to the electrodes 201-206. The electrode data collected by the navigation computer system 20 may include intracardiac electrograms recorded by the indicator electrodes 202-205 and the reference electrodes 201, 206. FIG. 7C illustrates a graph showing poor contact quality between the lobe 32 of the LAA occlusion device 30 at electrode 202 and the LAA wall 161. The graph is generated by subtracting the electrical signals for electrode 201 from the electrical signals for electrode 202, where electrode 201 functions as the reference electrode and electrode 202 functions as the indicator electrode. FIG. 7D illustrates a graph showing good contact quality between the disc 34 of the LAA occlusion device 30 at electrode 205 and the LAA wall 161. The amplitude of the periodic spikes indicates a degree of contact. For example, when the LAA occlusion device 30 exerts more pressure at a specific electrode, the corresponding amplitude will be higher. The graph is generated by subtracting the electrical signals for electrode 206 from the electrical signals for electrode 205, where electrode 206 functions as the reference electrode and electrode 205 functions as the indicator electrode. The magnitude of the subtracted electrical signals in FIGS. 7C-7D provides a quantified metric describing a degree of contact between the corresponding electrode 202, 205 and the LAA wall 161. In some embodiments, the navigation computer system 20 generates and displays real-time electrode data and/or navigation guidance information regarding contact quality on a display 23 communicatively coupled to the navigation computer system 20. As used herein, the term electrode data may include raw electrode data and/or processed electrode data collected from any one or any combination of electrodes 48-62 of an LAA occlusion device 30, electrodes 80-88 of a delivery device 70, and/or electrodes 18, 19, 12, 14, 16, 22, 21 of the medical navigation system 5.

In some embodiments, the medical navigation system 5 is used to standardize device placement confirmation techniques, such as but not limited to the tug test. The tug test is a procedure performed by the physician after the disc 34 is fully deployed but before releasing (e.g., unscrewing) the LAA occlusion device 30 from the push rod within the delivery device 70. The physician applies a clinically relevant force, such as by pulling or tugging the push rod (and optionally the delivery device 70), and subjectively evaluates whether the resistance that the physician perceives is sufficient to indicate secure fixation of the LAA occlusion device 30 within the LAA.

The techniques described herein enable quantification of the contact with and/or pressure exerted on the LAA wall 161 by the corresponding electrodes of the LAA occlusion device 30. For example, device placement confirmation techniques may be performed while observing output data presented on the display 23 of the medical navigation system 5. In some examples, one or more standardized values, such as one or more amplitudes of subtracted electrical signals, may be set as a sufficiency threshold. A sufficiency threshold is a value for a parameter that indicates secure fixation of the LAA occlusion device 30. The sufficiency threshold may correspond to changes in electrical signals observed when no pressure is applied to the push rod and/or delivery device 70, allowing the LAA occlusion device 30 to rest as deployed. As an alternative or addition, the sufficiency threshold may correspond to electrical signals observed when a physician performs the tug test. As an alternative or addition, the sufficiency threshold may correspond to electrical signals observed when a standardized amount of pressure is applied to the delivery device 70 in a proximal direction. In some embodiments, one of the indicator electrodes is configured in a bipolar fashion with a reference electrode. A three-dimensional shadow of the bipolar configuration location in the control non-tug situation will be created by the navigation computer system 20 before initiation of the tug test. The modification of the impedance signal in combination with the comparison of the electrodes' new position versus the initial position still indicated by the electrodes shadow will provide an indication of the pulling force generated during the tug test.

Implementation Mechanisms—Hardware Overview

The techniques described herein may be implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 8:
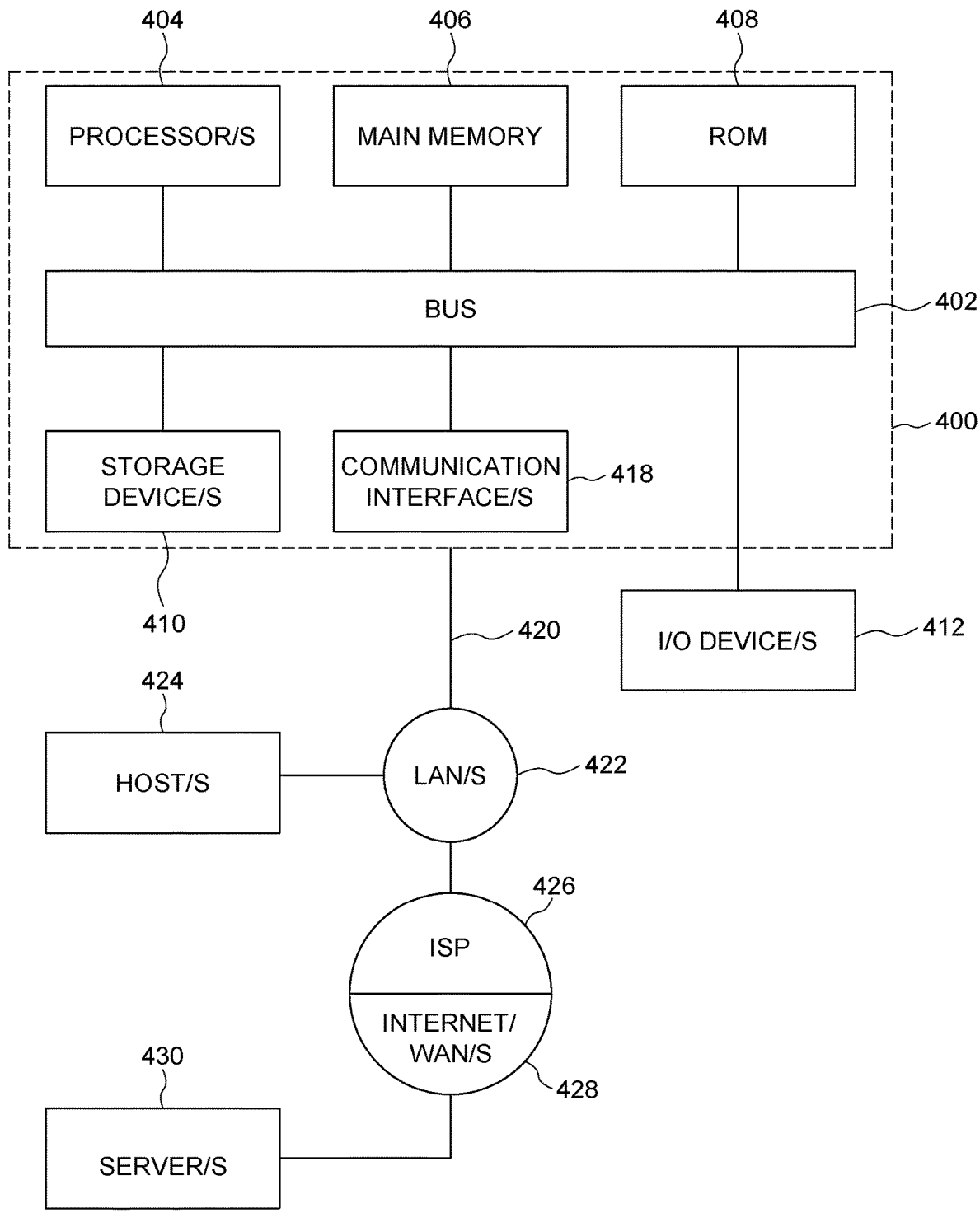
FIG. 8 is a block diagram that illustrates a computer system upon which one or more examples may be implemented.

FIG. 8 is a block diagram that illustrates a computer system upon which one or more examples may be implemented. The computer system 400 includes a bus 402 or other communication mechanism for communicating information, and one or more hardware processors 404 coupled with bus 402 for processing information, such as computer instructions and data. The processor/s 404 may include one or more general-purpose microprocessors, graphical processing units (GPUs), coprocessors, central processing units (CPUs), and/or other hardware processing units.

The computer system 400 also includes one or more units of main memory 406 coupled to the bus 402, such as random-access memory (RAM) or other dynamic storage, for storing information and instructions to be executed by the processor/s 404. Main memory 406 may also be used for storing temporary variables or other intermediate information during execution of instructions to be executed by the processor/s 404. Such instructions, when stored in non-transitory storage media accessible to the processor/s 404, turn the computer system 400 into a special-purpose machine that is customized to perform the operations specified in the instructions. In some embodiments, main memory 406 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 400 may further include one or more units of read-only memory (ROM) 408 or other static storage coupled to the bus 402 for storing information and instructions for the processor/s 404 that are either always static or static in normal operation but reprogrammable. For example, the ROM 408 may store firmware for the computer system 400. The ROM 408 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 410, such as a magnetic disk or optical disk, is provided and coupled to the bus 402 for storing information and/or instructions. The storage device/s 410 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 400 may be coupled via the bus 402 to one or more input/output (I/O) devices 412. For example, the I/O device/s 412 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 412 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 404 and for controlling cursor movement on another I/O device (e.g. a display). A cursor control device typically has degrees of freedom in two or more axes, (e.g. a first axis x, a second axis y, and optionally one or more additional axes z), that allows the device to specify positions in a plane. In some embodiments, the one or more I/O device/s 412 may include a device with combined I/O functionality, such as a touch-enabled display.

Other I/O device/s 412 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 404 over the bus 402.

The computer system 400 may implement the techniques described herein using customized hard-wired logic, one or more ASICs or FPGAs, firmware, and/or program logic that causes the computer system 400 to be a special-purpose machine. In some examples, the techniques herein are performed by the computer system 400 in response to the processor/s 404 executing one or more sequences of one or more instructions contained in main memory 406. Such instructions may be read into main memory 406 from another storage medium, such as the one or more storage device/s 410. Execution of the sequences of instructions contained in main memory 406 causes the processor/s 404 to perform the process steps described herein. In alternative embodiments, hard-wired circuitry may be used in place of or in combination with software instructions.

The computer system 400 also includes one or more communication interfaces 418 coupled to the bus 402. The communication interface/s 418 provide two-way data communication over one or more physical or wireless network links 420 that are connected to a local network 422 and/or a wide area network (WAN), such as the Internet. For example, the communication interface/s 418 may include an integrated services digital network (ISDN) card, cable modem, satellite modem, or a modem to provide a data communication connection to a corresponding type of telephone line. Alternatively and/or in addition, the communication interface/s 418 may include one or more of: a local area network (LAN) device that provides a data communication connection to a compatible local network 422; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between the computer system 400 and one or more LANs 422 and/or WANs.

The network link/s 420 typically provides data communication through one or more networks to other data devices. For example, the network link/s 420 may provide a connection through one or more local area networks 422 (LANs) to one or more host computers 424 or to data equipment operated by an Internet Service Provider (ISP) 426. The ISP 426 provides connectivity to one or more wide area networks 428, such as the Internet. The LAN/s 422 and WAN/s 428 use electrical, electromagnetic, or optical signals that carry digital data streams. The signals through the various networks and the signals on the network link/s 420 and through the communication interface/s 418 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 402. Transmission media can also take the form of acoustic or light waves, such as those generated during radio-wave and infra-red data communications.

Various forms of media may be involved in carrying one or more sequences of one or more instructions to the processor 404 for execution. For example, the instructions may initially be carried on a magnetic disk or solid-state drive of a remote computer. The remote computer can load the instructions into its main memory 406 and send the instructions over a telecommunications line using a modem. A modem local to the computer system 400 can receive the data on the telephone line and use an infra-red transmitter to convert the data to an infra-red signal. An infra-red detector can receive the data carried in the infra-red signal and appropriate circuitry can place the data on the bus 402. The bus 402 carries the data to main memory 406, from which the processor 404 retrieves and executes the instructions. The instructions received by main memory 406 may optionally be stored on the storage device 410 either before or after execution by the processor 404.

The computer system 400 can send messages and receive data, including program code, through the network(s), the network link 420, and the communication interface/s 418. In the Internet example, one or more servers 430 may transmit signals corresponding to data or instructions requested for an application program executed by the computer system 400 through the Internet 428, ISP 426, local network 422 and a communication interface 418. The received signals may include instructions and/or information for execution and/or processing by the processor/s 404. The processor/s 404 may execute and/or process the instructions and/or information upon receiving the signals by accessing main memory 406, or at a later time by storing them and then accessing them from the storage device/s 410.

Other Aspects of Disclosure

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A medical navigation system for an intravascular procedure, the medical navigation system comprising:
 a delivery device comprising a catheter;
 a left atrial appendage (LAA) occlusion device configured to be releasably disposed in the catheter for deployment and implantation at a target site of a patient, the LAA occlusion device comprising a first plurality of electrodes, the first plurality of electrodes including at least one indicator electrode and at least one reference electrode configured to not contact tissue when the LAA occlusion device is deployed at the target site; and
 a navigation computer system configured to be electrically coupled with the first plurality of electrodes, the navigation computer system comprising one or more processors and at least one memory storing instructions that, when executed by the one or more processors, cause the one or more processors to:
 control a drive source to transmit current to the first plurality of electrodes;
 collect electrode data corresponding to the first plurality of electrodes;
 monitor impedance corresponding to the at least one indicator electrode based on the electrode data; and
 determine that the at least one indicator electrode has made contact with the tissue based on the electrode data.

2. The medical navigation system of claim 1, wherein the target site is an LAA of the patient, and the tissue is an LAA wall.

3. The medical navigation system of claim 2,
 wherein the LAA occlusion device includes a disc at a proximal end of the LAA occlusion device; and
 wherein the at least one indicator electrode is disposed on an edge surface of the disc.

4. The medical navigation system of claim 3, wherein the first plurality of electrodes includes at least two indicator electrodes disposed on the edge surface of the disc that are evenly spaced around the edge surface.

5. The medical navigation system of claim 2,
wherein the LAA occlusion device includes a lobe at a distal end of the LAA occlusion device; and
wherein the at least one indicator electrode is disposed on a side surface of the lobe.

6. The medical navigation system of claim 5, wherein the at least one electrode is disposed on a distal edge of the side surface of the lobe.

7. The medical navigation system of claim 5, wherein the at least one electrode is disposed on a proximal edge of the side surface of the lobe.

8. The medical navigation system of claim 5, wherein the at least one electrode is disposed between a distal edge and a proximal edge of the side surface of the lobe.

9. The medical navigation system of claim 1, wherein the at least one indicator electrode includes a first indicator electrode expected to make contact with the tissue when the LAA occlusion device is deployed at the target site.

10. The medical navigation system of claim 1, wherein the instructions, when executed by the one or more processors, cause the one or more processors to evaluate a degree of contact between the at least one indicator electrode and the tissue based on electrode data corresponding to the at least one reference electrode and the at least one indicator electrode.

11. The medical navigation system of claim 10, wherein evaluating the degree of contact between the at least one indicator electrode and the tissue includes subtracting electrode signals corresponding to the at least one reference electrode from electrode signals corresponding to the at least one indicator electrode and analyzing an amplitude of a resulting signal.

12. The medical navigation system of claim 1, wherein the at least one indicator electrode includes a second indicator electrode expected not to make contact with the tissue when the LAA occlusion device is deployed at the target site.

13. The medical navigation system of claim 12, wherein the instructions, when executed by the one or more processors, cause the one or more processors to generate a warning notification when the second indicator electrode makes contact with the tissue.

14. The medical navigation system of claim 12,
wherein the second indicator electrode is disposed on a distal tip of the LAA occlusion device.

15. The medical navigation system of claim 1, wherein the navigation computer system monitors impedance corresponding to the at least one indicator electrode based on electrode data generated based on three pairs of electrodes disposed on a surface of the patient during the intravascular procedure.

16. The medical navigation system of claim 1, wherein the instructions, when executed by the one or more processors, cause the one or more processors to:
determine a position and an orientation of the LAA occlusion device based on electrode data corresponding to the first plurality of electrodes; and
cause a display communicatively coupled to the navigation computer system to display a representation of the LAA device relative to a representation of an anatomy of the patient.

17. The medical navigation system of claim 16, wherein the representation of the anatomy of the patient is based on a 3D model of the anatomy of the patient generated prior to the intravascular procedure.

18. The medical navigation system of claim 1,
wherein the catheter is a steerable catheter comprising a second plurality of electrodes disposed on a distal end of the steerable catheter;
wherein the instructions, when executed by the one or more processors, cause the one or more processors to:
determine a location of each of the second plurality of electrodes;
determine a configuration and location of the distal end of the steerable catheter; and
cause a display communicatively coupled to the navigation computer system to display a representation of the distal end of the steerable catheter device relative to the anatomy of the patient.

* * * * *